United States Patent
Knafl et al.

(10) Patent No.: US 8,820,301 B2
(45) Date of Patent: Sep. 2, 2014

(54) MODULATING HYDRODYNAMIC FLOW CHARACTERISTICS TO ALLEVIATE AUTOMOTIVE HEAT EXCHANGER CONTAMINATION

(75) Inventors: Alexander Knafl, Anacortes, WA (US); Patrick G. Szymkowicz, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1003 days.

(21) Appl. No.: 12/873,356

(22) Filed: Sep. 1, 2010

(65) Prior Publication Data

US 2012/0048245 A1   Mar. 1, 2012

(51) Int. Cl.
*F02B 47/08*   (2006.01)
*F02M 25/07*   (2006.01)
*F02D 41/00*   (2006.01)

(52) U.S. Cl.
CPC ....... *F02D 41/0077* (2013.01); *F02M 25/0738* (2013.01); *Y02T 10/47* (2013.01); *F02M 25/0731* (2013.01); *F02M 25/0701* (2013.01)
USPC .................. 123/568.12; 123/568.21; 701/108

(58) Field of Classification Search
USPC ........ 73/114.74; 123/568.11, 568.12, 568.21; 165/95, 96; 701/108, 111
See application file for complete search history.

(56) References Cited

U.S. PATENT DOCUMENTS

| | | | |
|---|---|---|---|
| 4,593,748 A * | 6/1986 | Kramb | 165/51 |
| 5,538,420 A * | 7/1996 | Klobucar et al. | 432/2 |
| 6,904,898 B1 | 6/2005 | Sahlen | |
| 6,945,235 B1 * | 9/2005 | Bertilsson et al. | 123/568.11 |
| 7,281,529 B2 * | 10/2007 | Lew et al. | 123/568.12 |
| 7,284,544 B2 * | 10/2007 | Hatano | 123/568.12 |
| 7,370,644 B2 * | 5/2008 | Wang | 123/568.12 |
| 7,591,256 B2 * | 9/2009 | Elsasser et al. | 123/568.24 |
| 7,866,140 B2 * | 1/2011 | Chillar et al. | 60/39.52 |
| 7,870,718 B2 * | 1/2011 | Chillar et al. | 60/39.52 |
| 8,061,138 B2 * | 11/2011 | Pearson | 60/605.2 |
| 8,375,713 B2 * | 2/2013 | Ryan et al. | 60/605.2 |
| 2007/0289582 A1 | 12/2007 | Elsasser et al. | |
| 2009/0235662 A1 | 9/2009 | Knafl et al. | |
| 2011/0005503 A1 * | 1/2011 | Harden et al. | 123/568.12 |
| 2011/0094482 A1 * | 4/2011 | Weber et al. | 123/568.12 |

OTHER PUBLICATIONS

Förster, M., "Influence of the Adhesion Force Crystal/Heat Exchanger Surface on Fouling Mitigation", Chemical Engineering and Processing 38, (cont.) 1999, pp. 449-461.

* cited by examiner

*Primary Examiner* — Thomas Moulis
*Assistant Examiner* — Elizabeth Hadley (57) ABSTRACT

A vehicular heat exchanger processes a exhaust gas recirculation flow. A method to manage combustion by-product contaminant deposits within the heat exchanger includes repeatedly cycling a flow control device controlling the exhaust gas recirculation flow through the heat exchanger from an original position to an intermediate position and back to the original position. The original position is determined based upon a required exhaust gas recirculation flow into an intake manifold.

13 Claims, 5 Drawing Sheets

MODULATING HYDRODYNAMIC FLOW CHARACTERISTICS TO ALLEVIATE AUTOMOTIVE HEAT EXCHANGER CONTAMINATION

TECHNICAL FIELD

This disclosure is related to exhaust gas recirculation circuits in internal combustion engine applications.

BACKGROUND

Exhaust gas recirculation (EGR) is used in internal combustion engine control. EGR circuits remove a portion of exhaust gas flow from the exhaust system for ingestion as part of the cylinder charge. EGR circuits are known for use in many different engine types and configurations, for instance in both diesel and gasoline engines.

Combustion is highly dependent upon the conditions existing within the combustion chamber. Variations in properties such as temperature within the combustion chamber can cause adverse effects upon the resulting combustion. The temperature of the EGR flow channeled into the combustion chamber has effects upon the overall temperature within the combustion chamber. As a result of the need to control these temperatures, methods are known to modulate the temperature of EGR flow within the EGR circuit through the use of an EGR cooler including a heat exchange device.

Heat exchange devices can take many forms. One known heat exchange device is a gas to liquid type heat exchanger. Another known heat exchange device is a gas to gas type heat exchanger. Efficient heat transfer generally requires large surface areas through large cross sectional flow paths. Flow velocity generally decreases as cross sectional flow path increase.

EGR flows contain by-products of combustion. Particulate matter (PM) and other combustion by-products travel through the exhaust system with the exhaust gas flow. The EGR circuit, by tapping into the exhaust system, is exposed to these by-products. Heat exchangers can include narrow and subdivided passages in order to maximize heat transfer from the hot gas to the cooling liquid. However, narrow passages with large surface areas can act as filters to the combustion by-products, collecting particulate deposits on the surfaces within the passages. Additionally, testing has shown that lower exhaust gas velocities, such as tend to exist within a heat exchanger, increasing the rate at which particulate deposits are left on the surfaces. Such deposits within the heat exchanger can have a number of adverse effects upon the heat exchanger, including but not limited to corrosion, increased flow resistance, flow blockage, reduction of heat transfer capacity, and noise, vibration and harshness (NVH).

SUMMARY

A vehicular heat exchanger processes a exhaust gas recirculation flow. A method to manage combustion by-product contaminant deposits within the heat exchanger includes repeatedly cycling a flow control device controlling the exhaust gas recirculation flow through the heat exchanger from an original position to an intermediate position and back to the original position. The original position is determined based upon a required exhaust gas recirculation flow into an intake manifold.

BRIEF DESCRIPTION OF THE DRAWINGS

One or more embodiments will now be described, by way of example, with reference to the accompanying drawings, in which.

DETAILED DESCRIPTION

Figure 1:
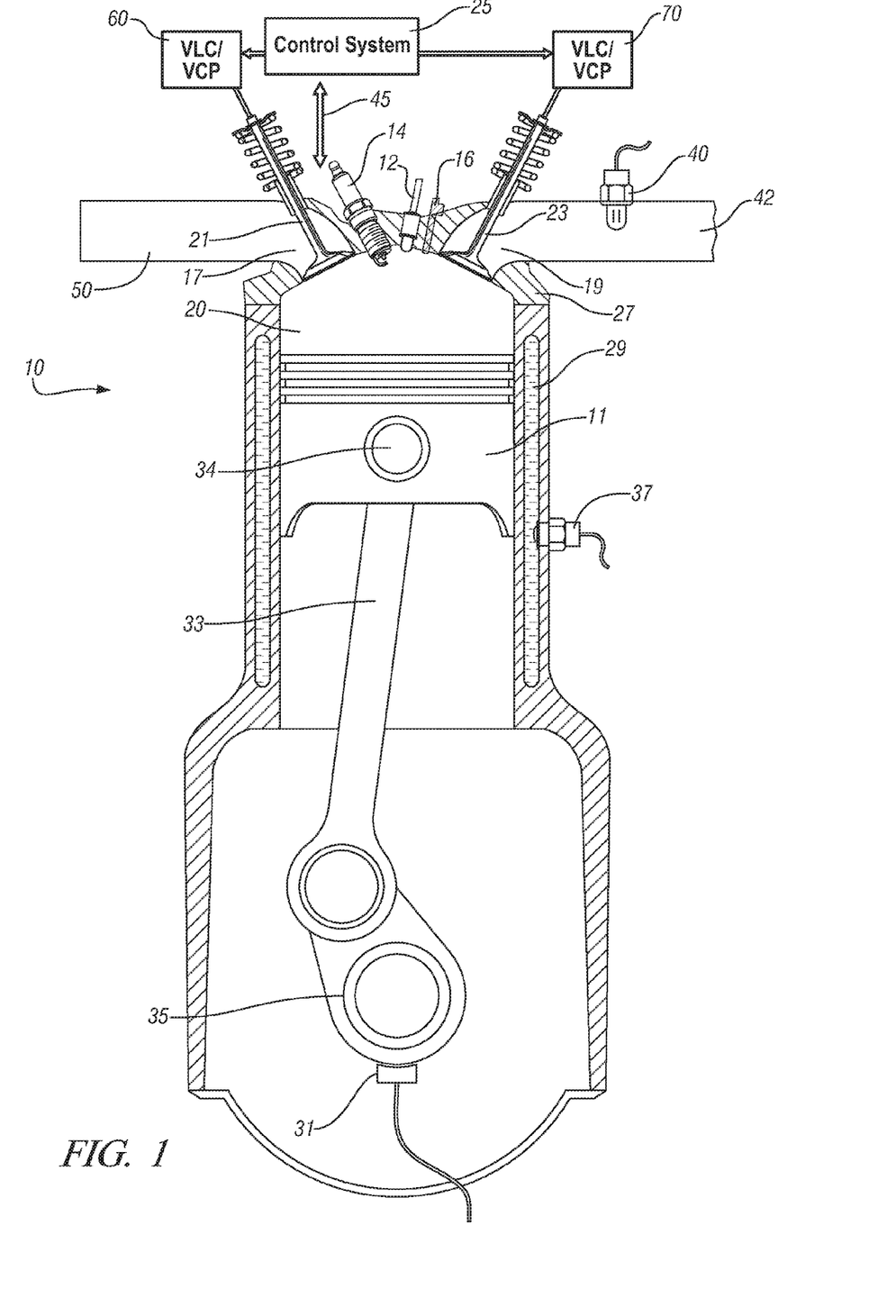
FIG. 1 is a schematic of an internal combustion engine and control system, in accordance with the present disclosure.

Referring now to the drawings, wherein the showings are for the purpose of illustrating certain exemplary embodiments only and not for the purpose of limiting the same, FIG. 1 shows a schematic of an internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine. However, as will be appreciated by one having ordinary skill in the art, the methods described herein can be utilized on many and various engine configurations, and the exemplary engine design depicted in FIG. 1 is meant for purposes of illustration only.

The exemplary engine 10 includes a cast-metal engine block with a plurality of cylinders formed therein, one of which is shown, and an engine head 27. Each cylinder includes a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a signal input to the control system 25 useable to control the engine. The engine preferably includes known systems including an external exhaust gas recirculation (EGR) valve and an intake air throttle valve.

Each moveable piston 11 includes a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 includes a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device 60 is operative to control opening and closing of each of the intake valves 21, and a second valve actuation device 70 operative to control opening and closing of each of the exhaust valves 23. Each of the valve actuation devices 60, 70 are signally connected to the control system 25 and operative to control timing, duration, and magnitude of opening and closing of each valve, either in concert or individually. The first embodiment of the exemplary engine includes a dual overhead cam system which has variable lift control (VLC) device and variable cam phasing (VCP) device. The VCP device is operative to control timing of opening or closing of each intake valve and each exhaust valve relative to rotational position of the crankshaft and opens each valve for a fixed crank angle duration. Exemplary VCP devices include known cam phasers. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Exemplary VLC devices include known two-step lift cams. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein. One having ordinary skill in the art will appreciate that engine valves and valve activation systems may take many forms, and the exemplary engine configuration depicted is for purposes of illustration only. Methods described herein are not intended to be limited to the particular exemplary configuration described herein.

Air is inlet to the intake port 17 through an intake manifold runner 50, which receives filtered air passing through a known air metering device and a throttle device. Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can include any of several known sensing devices operative to provide parametric values for the exhaust gas feedstream, including air/fuel ratio, or measurement of exhaust gas constituents, e.g. NOx, CO, HC, and others. The system may include an in-cylinder sensor for monitoring combustion pressures, non-intrusive pressure sensors, or inferentially determined pressure determination (e.g. through crankshaft accelerations). The aforementioned sensors and metering devices each provide a signal as a parametric input to the control system 25. These parametric inputs can be used by the control system to determine combustion performance measurements.

The control system 25 preferably includes a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and driveability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network (LAN) bus which preferably allows for structured communication of control parameters and commands between various controllers.

The control system 25 is operably connected to the engine 10, and functions to acquire parametric data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine coolant temperature, crankshaft rotational speed (RPM) and position, manifold absolute pressure, ambient air flow and temperature, and, ambient air pressure. Combustion performance measurements typically include measured and inferred combustion parameters, including air/fuel ratio, location of peak combustion pressure, among others.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve, and electronic throttle control module, and water injector 16. Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in an auto-ignition mode, the engine does not utilize an energized spark plug. It has proven desirable to employ spark ignition to complement auto-ignition modes under certain conditions, including, e.g. during cold start, at low load operating conditions near a low-load limit, and to prevent fouling. Also, it has proven preferable to employ spark ignition at a high load operation limit in auto-ignition modes, and at high speed/load operating conditions under throttled or un-throttled spark-ignition operation.

Control system, control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control system 25 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

EGR circuits are used in a wide variety of engine types and engine designs. FIG. 1 depicts an exemplary engine capable of utilizing an EGR circuit. The fuel air mixture utilized to power engine 10 may include gasoline or gasoline blends, but the mixture may also include other flexible fuel types, such as ethanol or ethanol blends such as the fuel commonly known as E85. Different engine configurations are known to utilize other fuels such as diesel fuel or diesel blends and utilize EGR circuits. The methods described do not depend upon the particular variety of fuel used and are not intended to be limited to the embodiments disclosed herein.

Figure 2:
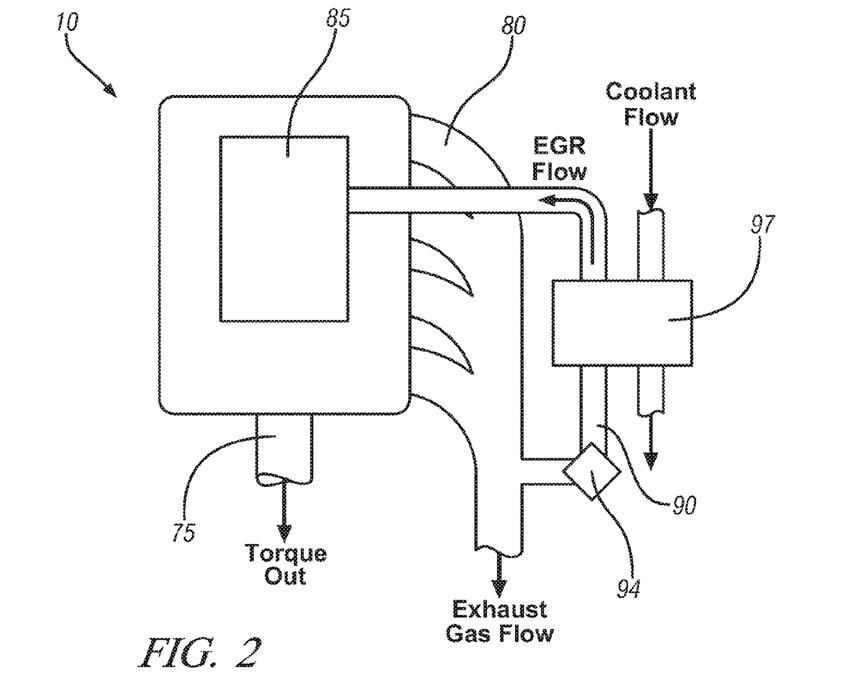
FIG. 2 is a schematic of an engine utilizing an EGR circuit including an EGR cooler, in accordance with the present disclosure.

FIG. 2 schematically illustrates an exemplary engine configuration utilizing an EGR circuit in accordance with the present disclosure. Engine 10 is depicted including an output shaft 75, an exhaust system 80, an intake manifold 85, and an EGR circuit 90. Engine 10 receives at least the air portion of the fuel air mixture necessary for combustion through the intake manifold 85, performs the combustion process within combustion chambers within engine 10, supplies a torque to output shaft 75, and emits an exhaust gas flow which exits engine 10 through exhaust system 80. EGR circuit 90 is communicably attached to exhaust system 80 and is depicted including an EGR valve 94 and an EGR cooler 97. EGR valve 94 is actuated by control system 25. Exemplary EGR valve 94 is a flow control device capable of blocking or enabling flow through the EGR circuit. However, flow control devices for an EGR circuit can include a number of different embodiments, and the disclosure is not intended to be limited to the exemplary EGR valve. Various control methodologies for activating the EGR valve under particular operating conditions are known in the art and will not be described in detail herein. EGR valve 94, when controlled to an off position, blocks any exhaust gas flow from exhaust system 80, the flow under a pressure gradient from the combustion process, from entering EGR circuit 90. EGR valve 94, when controlled to an on or open position, opens, and EGR circuit 90 can then utilize pressure and velocity of the exhaust gas flow to channel a portion of the exhaust gas flow into EGR circuit 90 as an EGR flow. EGR valve 94, in some embodiments, is capable of opening partially, thereby modulating the amount of exhaust gas diverted into an EGR flow. The EGR flow travels through EGR circuit 90 to intake manifold 85, where it is combined with at least the air portion of the fuel air mixture in order to derive the combustion control properties enabled by the use of an EGR as described above. As described above, the combustion process within engine 10 is sensitive to conditions such as the temperature within the combustion chamber during combustion. EGR flow taken from a high temperature exhaust gas flow can increase the temperature within the combustion chamber to undesirable levels. Therefore, it is known to utilize EGR cooler 97 to remove heat from the EGR flow, thereby controlling the resulting temperature of the EGR flow eventually entering the combustion chamber.

Various methods are known to reduce the temperature of a gas flow within a heat exchanger. Gas to gas heat exchangers are utilized to transfer heat from one gas flow to another. Gas to liquid heat exchangers are utilized to transfer heat from a gas to a liquid. Different gas or liquid mediums can be used to transfer heat to or from the gas flow. In any heat exchanger processing a gas flow, the gas flow enters the heat exchanger through gas flow passages, undergoes heat transfer with another medium, and exits the heat exchanger with a temperature change resulting from the heat transfer. Engines are known to utilize engine coolant liquid to cool various parts of the engine. An exemplary configuration of EGR cooler 97 is depicted in FIG. 2 as a gas to liquid heat exchanger, wherein a high temperature EGR flow passes through EGR cooler 97, transfers heat to a liquid medium in the form of an engine coolant liquid flow, the EGR flow thereafter exiting EGR cooler 97 as a reduced temperature EGR flow. Some known exemplary embodiments of EGR cooler 97 include an engine coolant control device in communication with control system 25 capable of controlling flow and amount of engine coolant liquid entering EGR cooler 97, thereby controlling the amount of heat transferred from the EGR flow and controlling the reduction in temperature of the EGR flow. Under some operating conditions and configurations, the engine coolant liquid flow can be turned off or the heat exchanger can be by-passed such that EGR flow is delivered to the combustion chamber at a maximum temperature.

Figure 3:
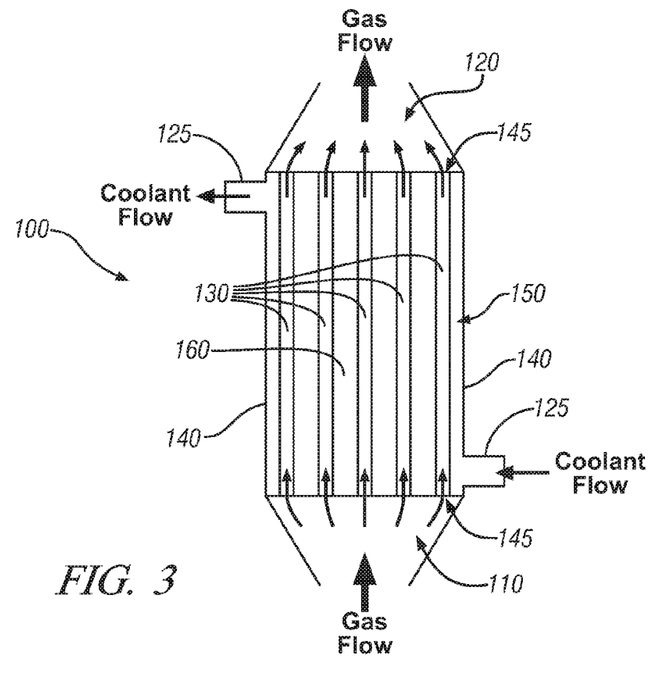
FIG. 3 is a sectional view of a known EGR cooler, in accordance with the present disclosure.

FIG. 3 is a schematic illustration of an exemplary gas to liquid heat exchanger in accordance with the present disclosure. Heat exchangers and components thereof can be made of many materials. High temperatures exhibited within the exhaust gas flow influence the choice of materials used within heat exchangers coming into contact with the high temperature gases. In addition, corrosive combustion by-products present in the exhaust gases also influence the choice of materials used. Stainless steel is one known material used in exhaust components for its resistance to both high temperatures and corrosion. Certain other designs, wherein temperatures reaching the heat exchanger are somewhat lower and corrosive forces are mitigated, can utilize other materials such as aluminum. Other exemplary designs of heat exchangers utilize plastic or other synthetic materials, for example, to construct portions of headers or connective orifices wherein direct exposure to a higher temperature flow is not permitted. Heat exchangers are known to include various coatings to protect the structure of the heat exchanger or to impart other beneficial properties. The materials described above are given for example only. Choice of materials and coatings in particular heat exchangers are known in the art, and the materials and constructions of heat exchangers within this disclosure are not intended to be limited to the specific exemplary embodiments described herein.

Returning to FIG. 3, an exemplary gas to liquid heat exchanger 100 is depicted including a gas inlet section 110, a gas outlet section 120, coolant orifices 125, a bundle of gas flow tubes 130, end plates 145, and heat exchanger shell 140. As mentioned above, any heat exchanger processing a gas flow includes gas flow passages. In this embodiment, the gas flow passages take the form of tubes 130. Heat exchanger shell 140 surrounds the bundle of tubes 130 and seals with the end plate 145 to form a liquid flow container 150. End plates 145 include openings designed to accept, fix, and seal to each of the tubes 130. Tubes 130 are arranged such that gaps 160 separate tubes from each other and from the heat exchanger shell 140. Coolant enters the liquid flow container 150 through a first coolant orifice 125 and flows around and through gaps 160 and exits the liquid flow container through a second coolant orifice 125. Likewise, a gas flow enters heat exchanger 100 through gas inlet section 110, flows through gas flow tubes 130, and exits the heat exchanger through gas outlet section 120. Because gas flow tubes 130 are in direct contact with the cooler liquid coolant flow on the outside and the hotter gas flow on the inside, heat can be transferred through the walls of tube 130, cooling the gas flow and warming the liquid flow. In this way, heat exchanger 100 enables the cooling of a hot gas flow.

Figure 4:
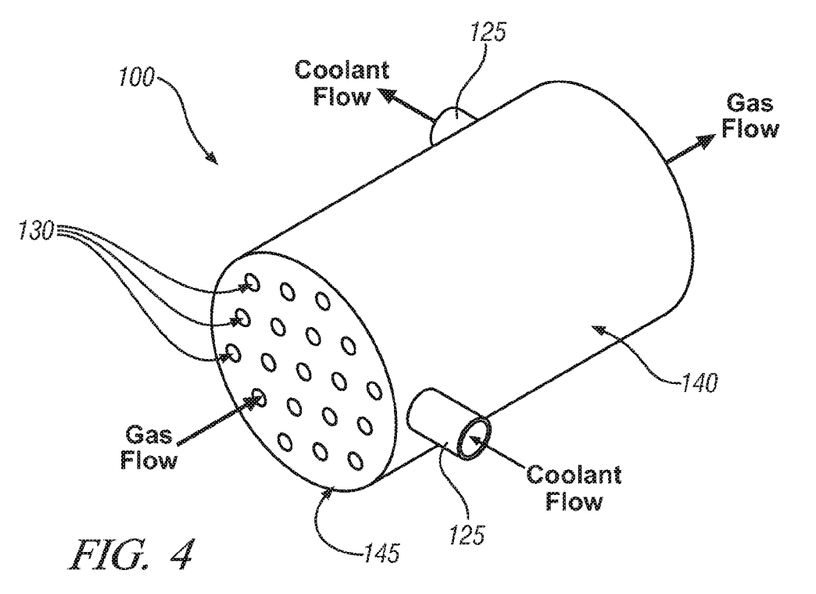
FIG. 4 is a perspective view of a heat exchanger utilized in a EGR cooler, in accordance with the present disclosure.

FIG. 4 is a perspective view of a gas to liquid heat exchanger including an exemplary configuration of tubes in accordance with the disclosure. Heat exchanger 100 includes heat exchanger shell 140 and end plates 145 affixed to either end. Tubes 130 are held in place by the two end plates 145 and run parallel to the larger cylinder created by the heat exchanger shell 140. Tubes as depicted are round in cross-section. However, it will be appreciated by one having ordinary skill in the art that tubes can be used in a wide variety of cross sectional shapes. Additionally, tubes may be hollow, with a cavity running longitudinally through the tube in the same shape as the outside of the tube, or tubes can utilize more complex shapes increasing the surface area that the gas flowing through the tube comes into contact with. Many tube designs are contemplated, and the disclosure is not intended to be limited to the exemplary embodiments described herein. Liquid coolant flow enters a first orifice 125, flows through the heat exchanger around the tubes 130, and exits the heat exchanger through a second orifice 125. Gas flow enters the heat exchanger through tubes 130, passes through the tubes, and exits the heat exchanger. Heat exchanger 100 is depicted as a cylinder shape, however it will be appreciated by one having ordinary skill in the art that heat exchanger 100 can be utilized in a number of shapes, and the disclosure is not intended to be limited to the exemplary embodiments described herein. It will also be appreciated that heat exchangers can alternatively be arranged such that the cooling medium can be made to flow through tubes, and the gas flow being cooled can be channeled through gas flow passages around the tubes containing the cooling medium. Various heat exchanger designs are contemplated, and the disclosure is not intended to be limited to the exemplary embodiments described herein.

Exemplary embodiments of an EGR cooler utilize heat exchangers to cool an EGR flow in preparation for the EGR flow being fed into a combustion chamber. As previously mentioned, EGR flow, being a diverted portion of the exhaust gas flow, contains PM and other contaminant by-products of the combustion process. Such by-products decrease the effectiveness of the EGR cooler and decrease the effective life of the EGR cooler. PM deposits left on the surfaces of the heat exchanger exposed to the gas flow act as an insulating blanket, decreasing the amount of heat that passes through the surfaces for a given temperature difference between the flow mediums. Deposits built up upon the walls of gas flow passages also decrease the effective cross sections of the gas flow passages, decreasing the flow of gas that flows through the gas flow passages for a given pressure difference across the heat exchanger. PM and other contaminants contain unburned hydrocarbons, other caustic substances, and water. Especially in the presence of elevated temperatures present in the engine compartment and the EGR flow, the deposits within the gas flow passages promote corrosion and other degradation of the EGR cooler.

EGR cooler fouling may become evident after sustained periods of operation, wherein an EGR flow at steady state creates deposits within the EGR cooler. Testing has shown that rapidly opening or closing an EGR valve creates a sharp change in exhaust gas velocity and can effectively dislodge deposited PM contaminants from walls of the EGR cooler. A method is disclosed to remove PM deposits in an EGR cooler by periodically rapidly cycling an EGR valve in a contaminant purging event in order to create a rapid pulse of changing shear forces with the EGR cooler to dislodge the PM deposits.

Figure 5:
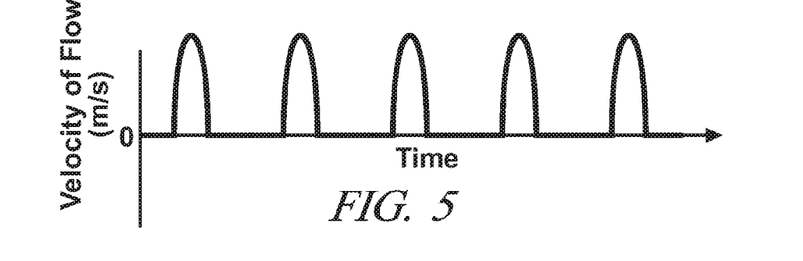
FIGS. 5-9 depict exemplary flow patterns that can be utilized by methods described herein, in accordance with the present disclosure.

A purging event can take many forms. FIGS. 5-9 graphically depict an exemplary velocity profiles possible within an EGR cooler consistent with purging PM contaminants from the cooler, in accordance with the present disclosure. FIG. 5 depicts an exemplary periodic opening and closing of a closed EGR valve. High pressure exhaust gas in the exhaust system passed through the opened EGR valve. Flow through the EGR valve is substantially proportional to the opening of EGR valve, subject to relationships known in the art. In a system with an EGR flow depicted in FIG. 5, the change in sheer forces upon the walls of the EGR cooler can be described by the change in velocity of flow depicted. Total resulting EGR flow through the EGR circuit over a time period with the flow depicted in FIG. 5 would be relatively low, depending upon the frequency and duration of the EGR valve openings.

Figure 6:
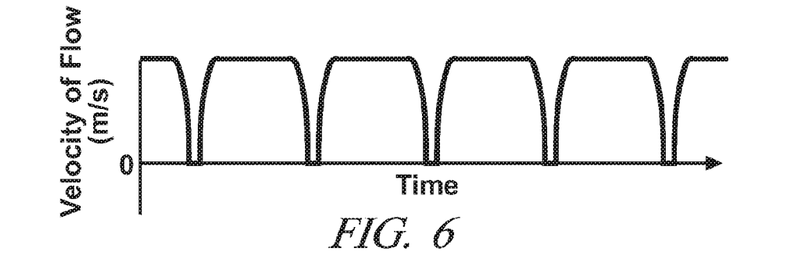

FIG. 6 depicts an exemplary periodic closing and reopening of an open EGR valve. The EGR flow is depicted to include a steady state EGR flow value with periodic interruptions of the EGR flow created by the periodic closing of the EGR valve. As in the condition depicted in FIG. 5, FIG. 6 describes high pressure exhaust gas flowing through the opened EGR valve. Again, the change in sheer forces upon the can be described by the change in velocity of flow depicted. The total resulting EGR flow through the EGR circuit over a time period with the flow depicted in FIG. 6 would be relatively high, depending upon the steady state EGR flow and the frequency and duration of the EGR valve closings.

Figure 7:
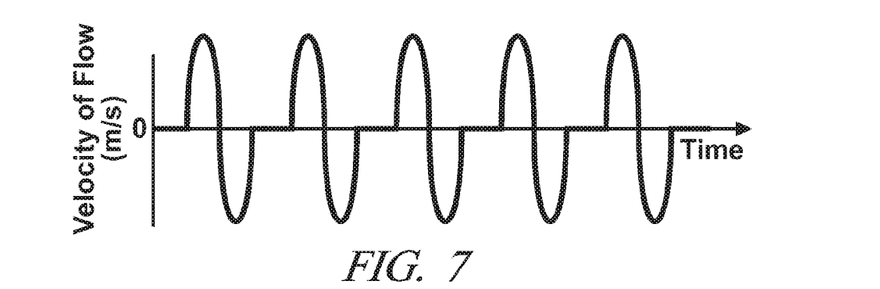

FIG. 7 depicts an exemplary periodic opening and closing of a closed EGR valve. A circuit containing a fluid or a gas can be selected or tuned such that a pressure wave running through the circuit and reflecting back through the circuit can have a desired effect. In this case, the EGR circuit and the opening and closing of the EGR valve is selected such that the pressure wave through the EGR circuit created by the opening of the EGR valve and the high pressure exhaust gas entering the EGR circuit create a substantially symmetric forward and backward flow through the EGR cooler of nearly or substantially equal magnitudes. It will be appreciated, based upon the increased change in velocity of the EGR flow, that an increased change in sheer forces is created upon the walls of the EGR cooler as compared to the EGR flow depicted in FIG. 5. As a result, under otherwise similar conditions, the EGR flow depicted in FIG. 7 can be more effective in cleaning deposits from the walls of the EGR cleaner than the EGR flow depicted in FIG. 5.

Figure 8:
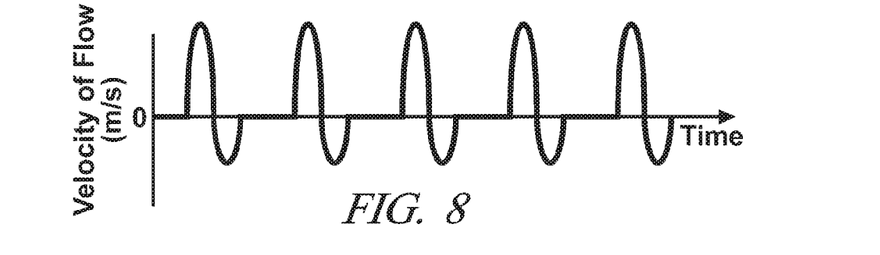

FIG. 8 depicts an EGR flow similar to the EGR flow depicted in FIG. 7, except that the EGR flow depicted in FIG. 8 is not substantially symmetric. Rather the flow in the forward direction through the EGR circuit is larger than the backward flow. As a result, the change in sheer forces upon the walls of the EGR cooler are greater in FIG. 8 than in FIG. 5 and less in FIG. 8 than in FIG. 7.

Figure 9:
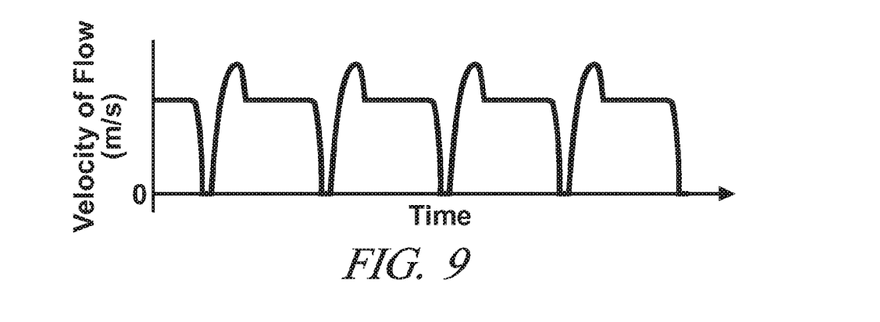

FIG. 9 depicts an EGR flow similar to the EGR flow depicted in FIG. 6, except that the EGR circuit is tuned such that, upon the EGR valve reopening, the EGR flow exceeds the steady state flow rate and then settles to the steady state value. As described in relation to FIGS. 7 and 8, the increased change in EGR flow depicted in FIG. 9 increases the change in sheer forces upon the walls of the EGR cooler as compared to the EGR flow depicted in FIG. 6. It will be appreciated that the embodiments described in FIGS. 5, 7, and 8 depict flow patterns most useful when no EGR flow is required, and the embodiments in FIGS. 6 and 9 depict flow patterns most useful when an EGR flow is required.

The embodiments described in FIGS. 5, 7 and 8 operate when the required flow through the EGR circuit or through the EGR cooler is zero. A method to operate one of these embodiments can include monitoring a required flow, determining the required flow to be zero, and commanding cycles of the EGR valve based upon the determining the required flow to equal zero.

Figure 11:
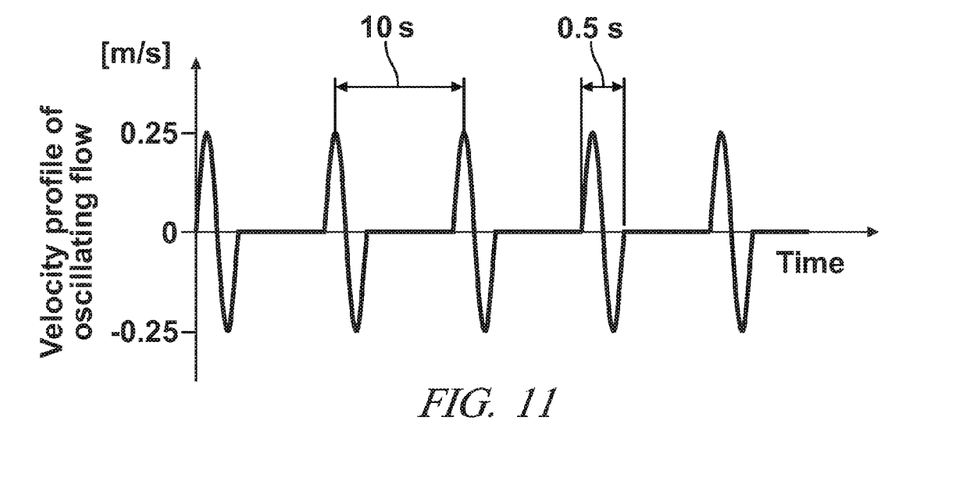
FIG. 11 depicts and exemplary flow pattern, in accordance with the present disclosure.

The exemplary flow embodiment of FIG. 11 is one embodiment of control parameters that can be utilized to create the desired flow pattern, in accordance with the present disclosure. A pattern including a 10 second period is depicted, with flow events for each period lasting a total of 0.5 seconds, with 0.25 seconds of positive flow and 0.25 seconds of negative flow. It will be appreciated that such a flow pattern including positive and negative flow can include parameters based upon the tuning of the EGR circuit. The parameters described in FIG. 11 are exemplary and the disclosure is not intended to be limited to the particular parameters described.

Figure 12:
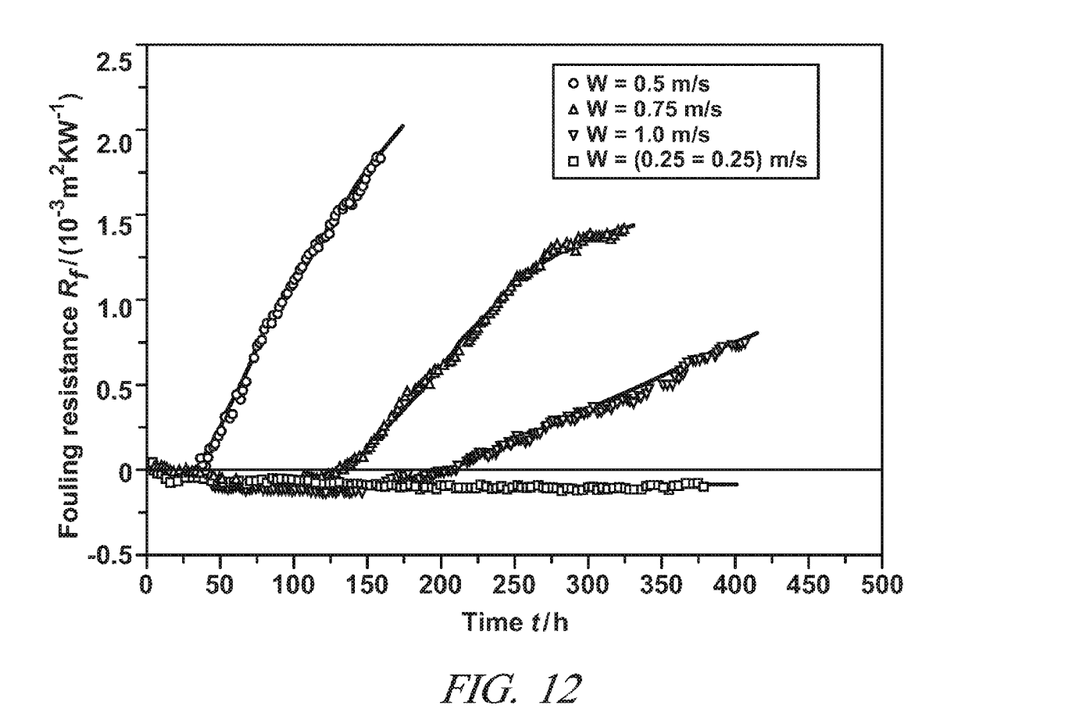
FIG. 12 depicts exemplary testing results, in accordance with the present disclosure.

Testing confirms that operation of purging events, including pulsing surges of flow through an EGR cooler, clears and maintains the EGR cooler by purging the pathways within the cooler of PM contaminants FIG. 12 graphically illustrates exemplary test results including fouling resistance values through a test period for various EGR flow velocities and for operation including purging events, in accordance with the present disclosure. The three EGR flow velocities listed, 0.5 m/s, 0.75 m/s, and 1.0 m/s, illustrate EGR operation wherein the EGR is operated at a fixed value. The test data describes an inverse relationship between flow velocity and fouling or formation of PM contaminants within the EGR cooler. A fourth data set describes operation wherein purging events are periodically operated in accordance with the exemplary methods described herein. This fourth data set includes a 0.25 m/s steady state pattern, overlaid with periodic changes consistent with the pattern of FIG. 11 (+/−0.25 m/s, 10 second period). Under normal circumstances, a slow velocity flow such as 0.25 m/s would exhibit increased fouling of the heat exchanger. Instead, the data shows that the purging event operate to prevent or clear any fouling buildup through the depicted test period. As is evident from the test data and the depicted results of FIG. 12, the EGR circuit shows no increased fouling resistance as a result of the operation including the purging events.

An EGR circuit can be equipped with a single flow control valve or EGR valve as depicted in FIG. 2. Rapid pulses in EGR flow through cycling of the EGR valve can be utilized to dislodge PM contaminants deposited within the EGR cooler as described above. A velocity profile within the EGR cooler as described in FIG. 11 can be achieved by selectively opening and closing the EGR valve in coordination with the desired velocity profile. As will be appreciated by one having ordinary skill in the art, higher relative pressure within the exhaust path as compared to the lower relative pressure within the intake manifold, or the pressure difference across the EGR circuit, will create a flow through the EGR circuit whenever the valve is open. The velocity of the gas in the EGR circuit can generally be described by the following equations:

$$\text{FLOW VELOCITY} = \text{FLOW RATE} / \text{CROSS SECTION AREA} \tag{1}$$

wherein $$\text{FLOW RATE} = \text{PRESSURE DIFFERENCE} / \text{FLOW RESISTANCE} \tag{2}$$

The pressure difference across the EGR circuit is a function of, among other factors, the operation of the engine. For a given period of engine operation and with other factors being held constant, the pressure difference can be taken as fixed value. Cross sectional area within the heat exchanger can be taken as a fixed value as the design value of the heat exchanger minus the constricting effect of any PM contaminants within the heat exchanger. Flow resistance for the EGR circuit, through an EGR valve cycle, is a function of the EGR valve position. When the EGR valve is closed, the flow resistance for the EGR circuit is infinite, with a corresponding flow rate of zero. When the EGR valve is open, the flow resistance of the EGR circuit becomes a value determined by the geometry within the EGR circuit. When the EGR valve is partially open, the flow resistance is some value between infinity and the value of the circuit with the open valve. Flow velocity through the EGR circuit can, therefore, be controlled through modulating flow resistance in the circuit, such as by modulating constriction of flow through the EGR valve. Opening and closing the EGR valve will produce a substantially equivalent rise and fall in flow velocity through the EGR circuit.

Figure 10:
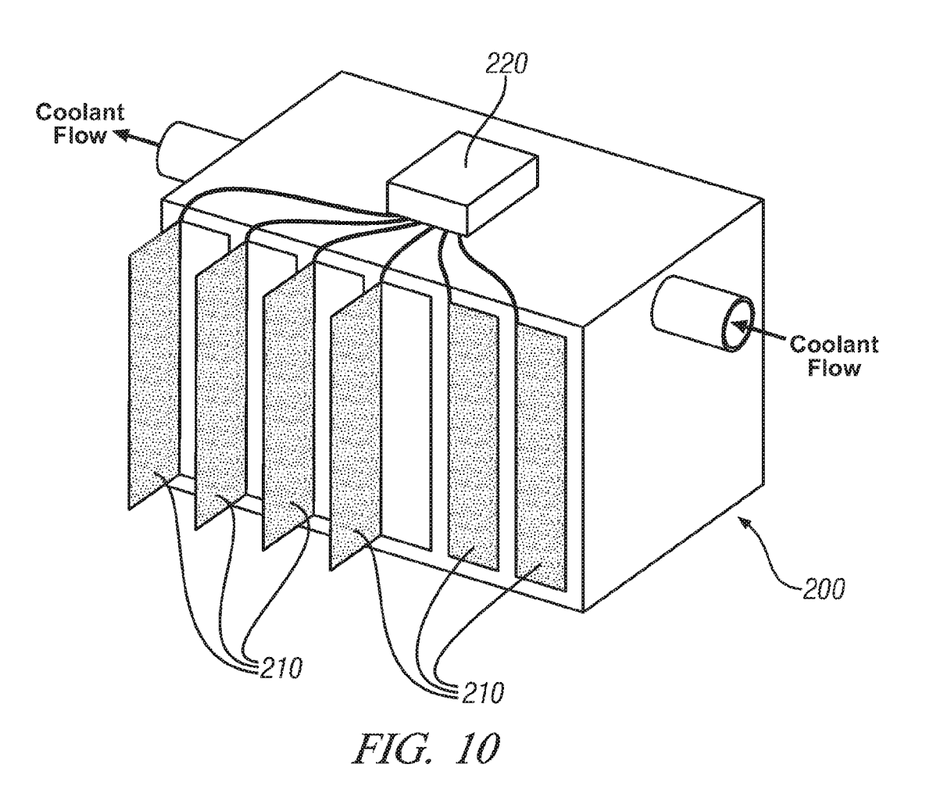
FIG. 10 is a perspective view of a heat exchanger utilizing flow control doors, in accordance with the present disclosure.

EGR circuits are known to include more than one flow control valve. FIG. 10 illustrates a perspective view of an exemplary EGR cooler in accordance with the present disclosure. EGR cooler 200 is depicted including a plurality of flow control doors 210 and control module 220. Flow control doors 210 are operative to individually open and close on command by control system 25 through control module 220. Flow control doors 210 are an example of a type of flow control device, such as the exemplary EGR valve, described above. Depending upon the particular design of the heat exchanger employed within the device, flow control doors 210 can be directly attached to corresponding gas flow passages of the heat exchanger, blocking or allowing EGR flow through the individual gas flow passages. Alternatively, flow control doors 210 can correspond directly to a group of gas flow passages; for instance, an individual door can cover a group of six tubes, incrementally opening or closing the tubes as a group. Alternatively, flow control doors 210 can be part of a separate housing or EGR cooler face cover, with each door opening covering a portion of the face of the heat exchanger. Such a configuration must still open and close gas passages in a step or binary manner, so as to avoid partially opened gas passages with lower EGR flow velocities. In the case of a separate housing or EGR cooler face cover holding flow control doors 210, especially if the doors are separated from the gas flow passage or tube openings, a gasketing device can be used to prevent EGR flow from spreading out at lower velocity to sections of the heat exchanger not directly corresponding to the door opening. Many embodiments of control doors 210 utilized in conjunction with the EGR cooler or multiple flow control valves accomplishing similar parallel path control of the EGR flow are envisioned, and the disclosure is not intended to be limited to the exemplary embodiments described herein. Control doors 210 employ sealing methods known in the art to prevent EGR flow from traveling past closed doors or passing from intended gas flow passages to unintended gas flow passages. Additionally, doors, gasketing devices, and any other components exposed to the gas flow must be constructed of materials capable of withstanding the temperatures and corrosive forces within the gas flow, as described above in relation to heat exchangers. Control module 220 is depicted as a single unit with control means directed to each individual flow control door 210. Control module 220 and the particular method that the module employs to control the various flow control doors can take many forms. For example, control module 220 can utilize a single electronic motor with an output shaft attached to a gear set or a cam device. Such gear sets and cam devices are known in the art and can translate a single rotational input into incremental door movements. Alternatively, door control module 220 can include a control module attached to individual electrical actuators attached to each door, the control module sending controlling electric signals to each actuator to effect open and close commands. Alternatively, door control module 220 can include individual electrical actuators attached to each door receiving commands directly from control system 25. Many embodiments of control methods to actuate flow control doors 210 are envisioned, and the disclosure is not intended to be limited to the exemplary embodiments described herein. By closing a portion of the flow control doors 210, EGR flow can be restricted to a portion of the gas flow passages within the EGR cooler, thereby reducing the cross section through which the EGR flow passes within the heat exchanger and increasing resulting the EGR flow velocities within the EGR cooler.

Applied to the methods described herein, changing EGR flow velocities to reduce or clear PM contaminants deposited within an EGR cooler, an EGR cooler with multiple doors covering or blocking flow to various sections of the EGR cooler can be utilized to provide changing flow velocities to the EGR cooler. For example, in an embodiment wherein no flow is required through the EGR circuit, the various doors can be cycled, for example, one door at a time for 50 cycles or 50 cycles of each door being sequentially cycled. Similarly, when a required flow is commanded through the EGR circuit, doors can take turns cycling closed. Additionally, it will be appreciated that under some conditions, only a portion of a full flow through the EGR circuit is required. Under such conditions, an EGR cooler with four doors controlling flow through the EGR cooler might be able to provide the required EGR flow with two of the four doors open. In such a circumstance, the controller for the doors can select a portion of the doors to remain open and another portion of the doors to periodically cycle to clear PM contaminants, and then the controller can switch the functions of the various doors after a time period. A number of similar methods, sequences, or control strategies to control an EGR circuit with multiple doors or valves controlling flow through an EGR cooler are envisioned, and the disclosure is not intended to be limited to the particular exemplary embodiments described herein.

Methods to measure or estimate an EGR flow through an EGR circuit are known in the art and can be utilized to control a required flow through the plurality of doors or control valves, as described above. A required flow through the EGR is a control signal based upon engine operation and frequently originates in the engine control module and is determined by methods known in the art.

Methods described above, utilizing opening of individual doors, valves, or opening individual paths can be operated to purge the entire EGR cooler with each purging event. In the alternative, if certain pathways through the EGR cooler are known to accumulate PM contaminants more quickly, for example, in operation wherein some flow control doors are kept open more frequently than other doors, purging events can be operated to purge PM contaminants from the pathways with more contaminants more frequently. For example, pathways utilized in operation of the EGR can be purged in every purging event, and pathways utilized only in some operation of the EGR can be purged in every other or every third purging event. An exemplary control method could accumulate time samples for the various paths in operation in order to track likely need to purge the various paths. In this way, purging events can be limited in scope and duration based upon predicted contamination of the EGR cooler.

Purging events can be operated periodically, at regular intervals throughout use of the engine. In the alternative, use of the EGR circuit, as monitored, estimated by engine operation, or predicted based upon any method sufficient to estimate accumulated flow through the EGR circuit, can be used to selectively schedule or initiate purging events. Purging events can be scheduled individually, including a single opening and closing cycle. In the alternative, purging events can be collectively scheduled to include a plurality or recurring pattern of opening and closing cycles. For example, in FIG. 11, an exemplary grouping of opening and closing cycles is described, operated at 10 second intervals, each lasting 0.5 seconds. In the alternative, multiple opening and closing cycles can be operated in sequence with periods of sustained closure between the groups of sequential cycles. Operation of periodic opening and closing events can be selectively operated and disabled, based upon usage of the EGR circuit. The operation and timing of such a grouping can be modified based upon effect of the EGR flow upon engine operation and estimated PM contamination in the EGR cooler.

The above methods tune an EGR circuit such that cycling an EGR valve results in a predictable pressure wave oscillating through the EGR circuit. It will be appreciated that such a tuning can be an active selection of the length of the EGR circuit resulting in a desired period for the pressure wave oscillation, for example, to match a desired period of the cycling of the EGR valve. In addition or in the alternative, an existing or desired EGR circuit can be analyzed for a period for a pressure wave oscillation, and a period for the cycling of the EGR valve can be selected based upon the analysis. In addition or in the alternative, placement of the EGR valve within the EGR circuit can affect the period of a resulting pressure wave oscillation within the EGR circuit. Factors affecting a period of a pressure wave oscillation within an EGR circuit and factors in controlling an EGR valve to match a pressure wave oscillation are known in the art and will not be described in detail herein.

The above methods describe periodically cycling the EGR valve or control doors to purge and maintain the EGR cooler. It will be appreciated that the cycling of the EGR valve needs to be repeated as a single opening and closing of the EGR valve is unlikely to purge the contaminants from the EGR cooler. However, the cycling need not be regular or periodic. Repeated cycling with changing or irregular intervals between the cycles is equivalent to periodic cycles.

The methods described herein are employed by generating commands in a control module to the flow control device or devices. The control module can be an independent device or group of devices, or the control module can be part of an engine control module. Such a control module is a electronic device monitoring inputs and generating signal outputs based upon the methods described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to manage combustion by-product contaminant deposits within a heat exchanger of a vehicle, wherein the heat exchanger processes an exhaust gas recirculation flow, the method comprising:
repeatedly cycling a flow control device controlling the exhaust gas recirculation flow through the heat exchanger from an original position to an intermediate position and back to the original position wherein the original position is determined based upon a required exhaust gas recirculation flow into an intake manifold;
monitoring a period of a pressure wave oscillation through a circuit containing the heat exchanger resulting from the cycling the flow control device, wherein cycling the control device is based upon the period of the pressure wave oscillation;
estimating an accumulated flow of the exhaust gas recirculation flow through the heat exchanger; and
controlling the repeated cycling of the flow control device based upon the estimated accumulated flow of exhaust gas.

2. The method of claim 1, wherein repeatedly cycling the flow control device from the original position to the intermediate position and back to the original position comprises repeatedly cycling the flow control device from a closed position to an open position and back to the closed position.

3. The method of claim 1, wherein repeatedly cycling the flow control device from the original position to the intermediate position and back to the original position comprises repeatedly cycling the flow control device from an open position to a closed position and back to the open position.

4. The method of claim 1, wherein repeatedly cycling the flow control device from the original position to the intermediate position and back to the original position comprises repeatedly cycling the flow control device from a closed position to an open position and back to the closed position; and
wherein cycling the control device based upon the period of the pressure wave oscillation comprises controlling a period of the cycling the control device to create a flow in a first direction through the heat exchanger and a subsequent flow in a second direction opposite to the first direction.

5. The method of claim 1, wherein repeatedly cycling the flow control device from the original position to the intermediate position and back to the original position comprises repeatedly cycling the flow control device from an open position to a closed position and back to the open position; and
wherein cycling the control device based upon the period of the pressure wave oscillation comprises controlling a period of the cycling the control device to create, upon controlling the flow control device back to the open position, a flow through the heat exchanger exceeding a steady state flow and a subsequent flow through the heat exchanger at the steady state flow.

6. The method of claim 1, further comprising:
repeatedly cycling a plurality of flow control devices controlling the exhaust gas recirculation flow through the heat exchanger, cycling each of the flow control devices from an original position to an intermediate position and back to the original position.

7. The method of claim 6, wherein cycling each of the plurality of flow control devices from the original position to the intermediate position and back to the original position comprises cycling one of the plurality of flow control devices at a time.

8. The method of claim 6, wherein cycling each of the plurality of flow control devices from the original position to the intermediate position and back to the original position comprises:
utilizing a portion of the plurality of flow control devices to create a required flow; and
cycling another portion of the flow control devices from a closed position to an open position and back to the closed position.

9. Method to remove particulate matter deposits from an exhaust gas recirculation cooler in a vehicle, the method comprising:
monitoring a required flow through the exhaust gas recirculation cooler;
determining the required flow through an exhaust gas recirculation circuit employing the exhaust gas recirculation cooler to equal zero;
rapidly changing a flow velocity through the exhaust gas recirculation cooler by repeatedly cycling opened and closed an exhaust gas recirculation valve responsive to the required flow through the exhaust gas recirculation circuit equal to zero; and
tuning the exhaust gas recirculation circuit including the exhaust gas recirculation cooler based upon creating a forward flow and a subsequent reverse flow through the exhaust gas recirculation cooler for each of the repeated cycles of the exhaust gas recirculation valve.

10. Method to remove particulate matter deposits from an exhaust gas recirculation cooler in a vehicle, the method comprising:
monitoring a required flow through the exhaust gas recirculation cooler;
determining the required flow through an exhaust gas recirculation circuit employing the exhaust gas recirculation cooler to equal zero; and
rapidly changing a flow velocity through the exhaust gas recirculation cooler by repeatedly cycling opened and closed an exhaust gas recirculation valve responsive to the required flow through the exhaust gas recirculation circuit equal to zero;
wherein repeatedly cycling opened and closed an exhaust gas recirculation valve comprises cycling the exhaust gas recirculation valve based upon an analyzed period of a pressure wave oscillation through the exhaust gas recirculation circuit including the exhaust gas recirculation cooler.

11. System to manage combustion by-product contaminant deposits within an exhaust gas recirculation cooler of an engine, the system comprising:
an exhaust gas recirculation circuit comprising:
the exhaust gas recirculation cooler; and
a flow control device selectively blocking or allowing an exhaust gas recirculation flow through the exhaust gas recirculation cooler; and
a control module:
controlling the flow control device to an original position based upon a monitored required exhaust gas recirculation flow;
monitoring operation of the exhaust gas recirculation circuit;
estimating an accumulated flow of exhaust gas through the exhaust gas recirculation circuit based upon the monitored operation; and
generating commands to repeatedly cycle the flow control device controlling the exhaust gas recirculation flow through the heat exchanger from the original position to an intermediate position and back to the original position based upon the estimated accumulated flow of exhaust gas, wherein generating commands to repeatedly cycle the flow control device is based upon a monitoring period of a pressure wave oscillation through the exhaust gas recirculation circuit.

12. The system of claim 11, wherein generating commands to repeatedly cycle the flow control device controlling the exhaust gas recirculation flow comprises repeatedly cycling the flow control device from a closed position to an open position and back to the closed position.

13. The system of claim 11, wherein generating commands to repeatedly cycle the flow control device controlling the exhaust gas recirculation flow comprises repeatedly cycling the flow control device from an open position to a closed position and back to the open position.

* * * * *